Aug. 27, 1940.  E. T. HERMANN  2,213,041

METHOD OF AND APPARATUS FOR FORMING FILAMENTARY ARGILLACEOUS PARTICLES

Filed July 26, 1937

INVENTOR.
Earnest T. Hermann
BY
ATTORNEYS.

Patented Aug. 27, 1940

2,213,041

UNITED STATES PATENT OFFICE 2,213,041

METHOD OF AND APPARATUS FOR FORMING FILAMENTARY ARGILLACEOUS PARTICLES

Earnest T. Hermann, El Segundo, Calif.

Application July 26, 1937, Serial No. 155,742

8 Claims. (Cl. 25—1)

This invention relates to the formation of fluid-pervious bodies, and pertains particularly to a method of extruding a plastic argillaceous material in the production of intermingled filamentary strands, an apparatus in which the method may be practiced, and to a light-weight fluid-pervious body which may be formed from the extruded particles.

This application is a continuation-in-part of my copending applications Serial Nos. 528,224, filed April 6, 1931 (issued October 12, 1937 as Patent No. 2,095,252), and 548,905, filed July 6, 1931 (issued July 27, 1937 as Patent No. 2,087,973).

One of the principal objects of the invention is to provide an extrusion method which may be carried out inexpensively, and which is capable of producing a mass of elongated particles of small cross-section in a rapid and continuous manner.

A further object of the invention is to provide a method and apparatus for producing extruded filamentary particles in a curled or contorted condition whereby the particles are assembled into a ceramic body having a maximum of internal voids.

In producing filamentary particles from a plastic argillaceous body, considerable difficulty has heretofore been experienced in producing particles of small cross-section with the conventional type of extrusion press. Furthermore, plastic argillaceous mixtures are considerably abrasive, and frequent renewal of the small apertured dies is necessary in the prior art devices, and inasmuch as the die plate was required to withstand the entire extrusion force, a relatively heavy plate was necessary, making the cost of replacement relatively high. According to the present invention, only a relatively thin extrusion plate is required, due to the comparatively low extrusion pressures necessary according to my method. In the production of light-weight ceramic bodies from filamentary strands of argillaceous material, it is desirable to have the filamentary strands extend in a highly contorted and twisted fashion throughout the body of material, so that the strands will be supportingly in contact with one another at a great number of points, and providing a multiplicity of internal voids substantially uniformly distributed throughout the body. When particles are prepared by extrusion in accordance with the established methods, the strands are substantially straight, or curled in one general direction, with the result that the strands tend to lie alongside one another into a compact mass, giving a minimum of internal voids. It is an important object of the present invention to provide for the extrusion of a plastic argillaceous mass in such manner as to form elongated filamentary particles of small cross-section which are intermingled and substantially wholly curled or distorted so that a minimum length of straight filamentary shape is experienced. A further important object of the invention is to provide an extrusion method and an apparatus useful therein in which the extruding force is applied to a body of plastic argillaceous material at continuously varying directions with respect to the extrusion openings, so that the extruded particles are subjected to uniform extrusion forces, resulting in the formation of a fluid-pervious body consisting of highly contorted filamentary particles.

The particles produced according to the present invention may be allowed to dry, subjected to a size reducing operation in the production of a mass of relatively short individual particles, and fired to form discrete ceramic particles, or the filamentary particles may be allowed to accumulate into an aggregate body which may subsequently be dried and integralized by a firing operation.

Alternatively, the method and apparatus may be employed for the purpose of drying a plastic material such as a clay, for grinding and mixing purposes, in which use the plastic material may be extruded into thin filamentary form in the formation of blocks or slabs of such filaments, and such blocks or slabs subjected to a rapid drying operation, the large surface area afforded by the strands making such rapid drying possible.

Other objects of the invention will be brought out in the ensuing description, or will be apparent therefrom. The accompanying drawings illustrate one embodiment of the extrusion apparatus of the present invention, the extrusion method as practiced therein, and a ceramic body which may be produced by such method, and referring thereto:

Figure 1:
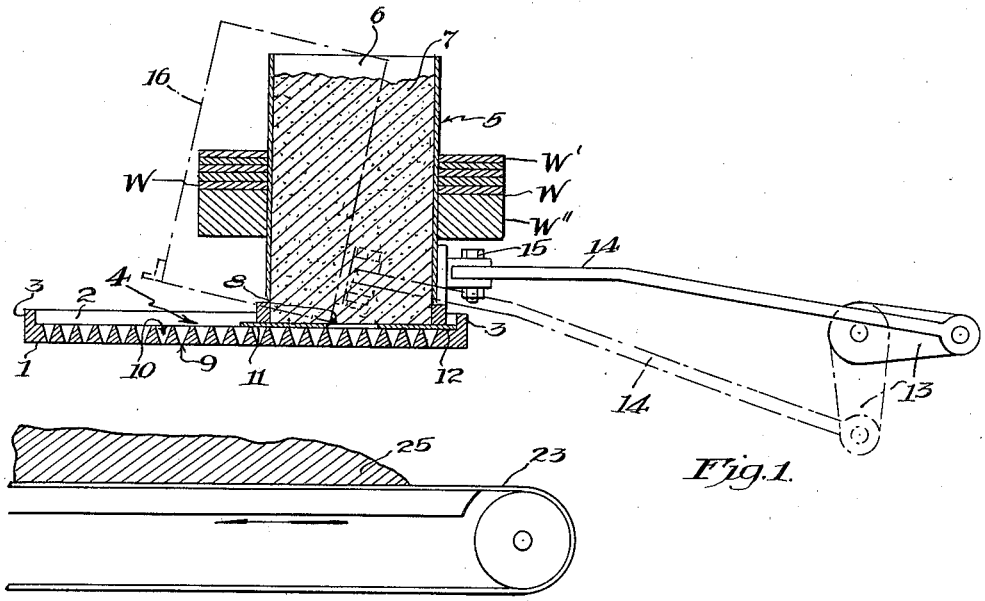
Fig. 1 is a sectional side elevation of an extrusion device according to the present invention, illustrating the formation of filamentary particles from a plastic argillaceous mixture.
Figure 2:
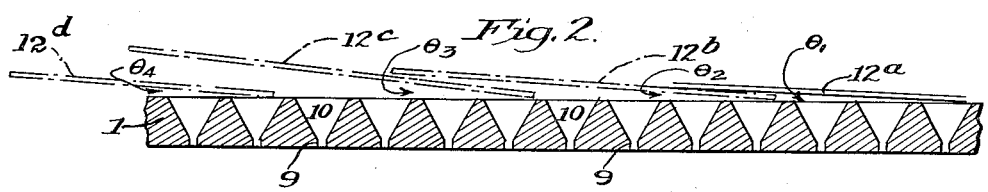
Figs. 2 and 3 illustrate the operating movements of the forming means in the production of extruded particles according to this invention, in a somewhat diagrammatic fashion.

As shown in Fig. 1, the device may comprise, essentially, a perforated extrusion plate 1 provided with side rails 2 and end rails 3, defining a working area 4. A combined receptacle and trowel member is disposed within the working area 4, as shown at 5, said member comprising a hopper portion 6 adapted to receive a body of plastic argillaceous material as at 7 and provided with an elongated opening 8 in the lower wall thereof, which extends substantially the full width of the perforated portion of the plate 1. The perforations 9 in the plate 1 are preferably counterbored upwardly so as to provide a tapered channel portion 10 (Fig. 2) opening upwardly into the space 4. The edge portions 11 and 12 of the bottom wall of the hopper 6 constitute trowel members which are caused to move along the length of the plate 1 through the agency of a suitable driving means such as indicated at 13, said driving means being connected to the side wall of the hopper 6 through the agency of a connecting rod 14 rigidly secured to said hopper as at 15. Upon rotation of the member 13, the member 5 will be moved back and forth along the length of the space 4 above the plate 1, and due to the rigid attachment of the connecting rod 14 to said member, said member will be given a rocking motion, as may be visualized from the dot-dash position thereof shown in mid-stroke, at 16 during which the lower or working surfaces of the trowel members will continuously vary in inclination with respect to the plate 1. In the movement of the member 5 from the full-line position toward the dot-dash position shown in Fig. 1, the troweling portion 12 will be moved across the open upper ends of the tapered channels 10, forcing material outwardly of said channels through the small extrusion openings 9. As shown in Fig. 2, the angle which the trowel 12 makes with the plate 1 will be constantly increasing until the mid-stroke position is reached, several positions of the trowel 12 being shown at 12a, 12b and 12c in Fig. 2, and the angle which the working surface of the trowel makes to the plate 1 being respectively designated at $\theta_1$, $\theta_2$, and $\theta_3$. As the member 5 is moved past mid-stroke position the trowel 12 will make a smaller and smaller angle with the plate 1 until the extreme left-hand position is reached at which time the bottom wall of the receptacle 6 will rest flatly upon the plate 1, and, in an intermediate position past the center, as at 12d in Fig. 2, the angle, $\theta_4$, is seen to be less than the angle $\theta_3$. As the member 5 is drawn to the right by a return movement of the member 13, the trowel member 11 will act in a manner comparable to the action of the trowel member 12 in the left-hand stroke, increasing in angle to the mid-stroke position as shown at positions 11a, 11b and 11c and then decreasing as shown at 11d until the member 5 is brought again into the position shown in full lines in Fig. 1.

Figure 3:
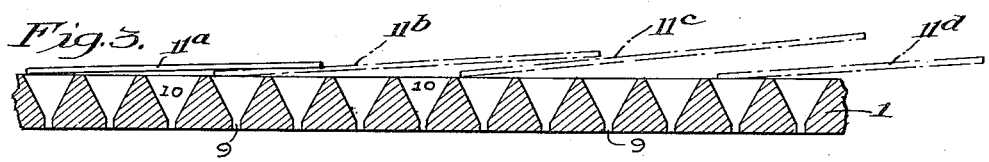

Due to the inherent cohesion of the plastic argillaceous material 7, the troweling action of the members 11 and 12 resulting in some of the material being forced outwardly through the openings 9 will cause the material 7 within the hopper to be drawn downwardly and under the troweling blades during their movement. The device is substantially self-feeding inasmuch as a continuous flow of material is produced downwardly through the opening 8 as long as the member 5 is in motion. One of the important characteristics of the device lies in the effect of the varying angularity of the trowel members with respect to the plate 1, which results in producing filamentary strands which are curled in constantly changing directions. For example, as the trowel member 12 moves through the positions 12a—12c, the constantly increasing angle thereof with respect to the plate 1 produces a differential pressure effect at the position of each one of the openings 9, resulting in the application of slightly more pressure to the rearward side of the openings than at the forward side of the openings (in the direction of motion of the trowel 12) which causes the filamentary particles to curve forwardly until the mid-stroke position is reached, at which time the pressure conditions are reversed due to the decreasing angularity of the trowel member and an increased pressure is produced at the forward side of the opening and a decreased pressure at the rearward side, causing the particles to curl rearwardly through the balance of the left-hand stroke of the member 5. On the return stroke, illustrated in part in Fig. 3, the trowel member 11 continuously increases in angularity up to the mid-point position and the pressure effect on the produced particles is reversed to that of the left-hand stroke.

In addition to the tendency for the particles to curl forwardly and rearwardly as above described, slight disconformities in the numerous openings 9 will cause some of the particles to shoot out at various angles to the vertical and the vibration of the device will cause the depending strands to swing into engagement with one another, at which time they will plastically interbond and further entangle.

Figure 4:
Fig. 4 illustrates a face view of a finished ceramic body of light-weight porous construction formed of filamentary particles produced in accordance with the present invention.

The reciprocating motion imparted to the member 5 is such that the speed of the member over the plate 1 is constantly varying over the length of the plate, and this movement, taken with the constant variation in the angle of action of the troweling blades 11 and 12 upon the material, contributes to the tendency of the device to "shoot" short threads (from three-eighths inch to two inches long) of plastic clay in random directions, causing the threads to become tangled and thereby increasing the percentage of large, intercommunicating voids between the particles. Means are preferably also provided for varying the downward pressure of the troweling blades 11 and 12 upon the upper surface of the plate 1, such as variable weighting means indicated at W (comprising, for example, a plurality of separate weights $w'$ of rectangular shape, provided with a central opening and adapted to fit about the hopper 6, and supported by a base member $w''$ secured to said hopper).

Where it is desired to form an aggregate mass of filamentary particles, I may provide an endless belt 23 disposed below the plate 1 in position to receive the filaments discharged from the openings 9 and allow the same to accumulate into a body indicated generally at 25. Due to the movement of the belt 23, the body 25 will comprise an average of the filaments discharged from the openings 9, and filaments of varying directions and intensities of curl will be distributed uniformly throughout the mass. In Fig. 4 I have illustrated an enlarged face view of a body produced by the extrusion of filaments according to the above description, said figure being accurately copied from an actual photograph of a body. It will be seen that there is a substantial uniformity in the size and character of the voids 26 lying between the filaments 27, producing a body of uniform cross-section and substantially equivalent strength in all directions.

The bodies which may be produced according to this invention are useful as acoustic material, as a lining for auditoriums, offices, and the like, wherein the material, due to the very limited plane reflecting area at the surface face reflects a very small percentage of incident sound, and, due to the large number of mutually intercommunicating voids therein, permits penetration of sound to within said material whereupon the successive reflection of said sound by the multiplicity of reflection surfaces offered by the body obtains a complete or substantially complete absorption of the sound. The material is also particularly adapted for the above use by reason of its marked fire resistant and retardant characteristics and its high mechanical strength in proportion to its weight. It will be appreciated that after the material is collected into a body such as shown at 25 it may be suitably molded by continuously operating rollers or the like in such manner as to produce a body of rectangular or other desired cross-section, and after drying, the material may be subjected to a firing operation which will produce the desired vitrification of the individual particles. Such bodies, in the form of slabs or blocks, are eminently suited for use as kiln "furniture," i. e., as refractory supports for ceramic ware in firing operations.

The pervious bodies produced according to this invention are also useful in industry and the arts as matrices for the support of catalytic agents, contact materials or the like, as filtration media or for other purposes for which the structure of such bodies render them suitable. In particular, random-sized irregular blocks of the material are useful as "granite" in septic tanks, for harboring "friendly" bacteria while permitting large fluid flows.

Due to the comparatively small area at which the maximum extrusion pressure is actually impressed upon the plate 1 at any one time, the strength of the plate 1 is not required to be particularly high, and for this reason may be made relatively thin. As a specific example, I have employed an extrusion plate approximately 10" x 22" in area, using a plate thickness of but ⅛". I have been able to employ extrusion openings 9 as small as 0.005" in diameter, and the actual length of the openings between the bottom of the plate 1 and the bottom of the counterbore 9 may be as little as 1/64".

Modifications in the specific means for varying the angle of the trowel members with respect to the working area of the extrusion plate, as well as the actual form of driving means, for example, will occur to those skilled in the art, and I do not choose to be limited to the specific structures herein delineated and described, but rather to the scope of the invention as defined in the subjoined claims.

I claim:

1. The method of forming a fluid-pervious body, which comprises: moving a trowel member over a perforated plate defining an extrusion surface while maintaining said trowel member at an angle to said surface; supplying a plastic material into position between said surface and said trowel member adjacent the forward portion of said trowel member with respect to the direction of movement thereof, said trowel member being biased toward said plate so as to exert pressure on said plastic material to extrude the same through the openings in said plate and being of smaller size than said extrusion surface whereby only a portion of said extrusion surface is subjected to the extrusion pressure exerted by said trowel member at any given time, and continuously varying the angle of said trowel member with respect to said extrusion surface.

2. Apparatus for forming a fluid-pervious mass of filamentary particles of plastic material, which comprises: a substantially horizontal extrusion plate of extended area provided with a plurality of extrusion openings extending therethrough in a direction transverse to the plane thereof; a trowel member mounted for movement over the upper surface of said plate and biased toward a position in engagement therewith and having a working surface disposed toward said plate; means operatively connected to said trowel member to move the same in one direction over said plate and to maintain said working surface inclined upwardly and forwardly in said direction throughout substantially the entire length of such movement; and means for supplying plastic material to the space between said inclined working surface and said plate during such movement.

3. The apparatus set forth in claim 2, said means for moving said trowel member including means for varying the angle of said working surface with respect to said plate.

4. The apparatus set forth in claim 2, said trowel member being elongated in a direction parallel to said plate and transverse to said one direction, and having a dimension in the direction of movement which is considerably less than the length of said plate in such direction.

5. An apparatus for forming a fluid-pervious mass of filamentary particles of plastic material, which comprises: a substantially horizontal extrusion plate of extended area provided with a plurality of extrusion openings extending therethrough in a direction transverse to the plane thereof; two spaced co-operating trowel members mounted for movement over the upper surface of said plate and biased toward a position in engagement therewith and each having a working surface disposed toward said plate; means operatively connected to said trowel members to move the same alternately in opposite directions over said plate and to maintain the working surface of one of said trowel members inclined upwardly and forwardly during the movement in one of said directions throughout substantially the entire length of such movement, and maintaining the working surface of the other of said trowel members inclined upwardly and forwardly during movement thereof in the opposite direction, said trowel members being spaced from one another in the direction of movement thereof; and means for supplying plastic material to the upper surface of said plate at a position between said trowel members.

6. The apparatus set forth in claim 5, said means for moving said trowel members including means for varying the angle of disposition of said working surfaces with respect to said extrusion plate throughout the movement thereof over said plate.

7. The apparatus set forth in claim 5, said means for moving said trowel members including means for varying the inclination of each of said trowel members between a minimum inclination at positions at the ends of the stroke of movement thereof and a maximum inclination at a position at the mid-stroke of such movement.

8. An apparatus for forming fluid-pervious bodies, which comprises: a substantially horizontal extrusion plate of extended area and provided with a plurality of extrusion openings extending transversely thereof; two elongated trowel members mounted for movement over the upper surface of said plate in a direction transverse to their length and spaced from one another in the direction of movement thereof; means for moving said trowel members between the ends of said extrusion plate, said moving means comprising a rotatable crank member and a connecting rod member, the latter being pivotally secured to said crank member at one end and rigidly secured to said trowel members at the other end and adapted to act upon said trowel members as a unit to cause only one of said trowel members to ride on the surface of said plate during movement thereof in one direction and only the other of said trowel members to ride upon the surface of said plate in the other direction, and to cause the respective trowel members to assume a gradually increasing angle with respect to said plate in moving to mid-stroke position and a gradually decreasing angle in moving from mid-stroke position in each direction of movement; and means for supplying a quantity of plastic argillaceous material to said plate at the position of the space between said trowel members.

EARNEST T. HERMANN.

CERTIFICATE OF CORRECTION.

Patent No. 2,213,041.  August 27, 1940.

EARNEST T. HERMANN,

It is hereby certified that error appears in the printed specification of the above numbered patent requiring correction as follows: Page 1, second column, line 15, for "uniform" read --ununiform--; and that the said Letters Patent should be read with this correction therein that the same may conform to the record of the case in the Patent Office.

Signed and sealed this 8th day of October, A. D. 1940.

(Seal)

Henry Van Arsdale,
Acting Commissioner of Patents.